(12) United States Patent
Colombet et al.

(10) Patent No.: US 11,709,695 B2
(45) Date of Patent: Jul. 25, 2023

(54) GENERATION, ACTUATION, AND ENFORCEMENT OF POLICIES FOR RESOURCES WITHIN A DISTRIBUTED COMPUTING SYSTEM

(71) Applicant: VMware, Inc., Palo Alto, CA (US)

(72) Inventors: Mathieu Colombet, Palo Alto, CA (US); Daniel Evan Schwartz, Palo Alto, CA (US); Julie A. Pickhardt, Boulder, CO (US); Prateek Gangwal, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 286 days.

(21) Appl. No.: 16/779,494

(22) Filed: Jan. 31, 2020

(65) Prior Publication Data
US 2021/0240507 A1    Aug. 5, 2021

(51) Int. Cl.
*G06F 9/455* (2018.01)
*G06F 9/50* (2006.01)
*G06F 21/33* (2013.01)

(52) U.S. Cl.
CPC ............ *G06F 9/45558* (2013.01); *G06F 9/50* (2013.01); *G06F 9/5061* (2013.01); *G06F 21/335* (2013.01); *G06F 2009/45562* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 10,613,888 B1* | 4/2020 | Mentz | ................. | G06F 9/45558 |
| 2006/0212453 A1* | 9/2006 | Eshel | ................. | H04L 67/1034 |
| 2012/0216241 A1* | 8/2012 | Alon | ..................... | H04L 63/029 726/1 |
| 2014/0331225 A1* | 11/2014 | Helander | .............. | G06F 21/577 718/1 |

* cited by examiner

*Primary Examiner* — Lewis A Bullock, Jr.
*Assistant Examiner* — Melissa A Headly
(74) *Attorney, Agent, or Firm* — DLA Piper LLP (US)

(57) ABSTRACT

The generation, actuation, and enforcement of policies within a distributed computing system is provided. The policies are employed to manage the resources of the system. The resources include virtualized resources, such as virtual machines (VMs) and virtual storage disks (VSDs). A policy includes a rule and scope. Enforcing a policy includes applying the rule to resources that are within the policy's scope. Policies are employed to constrain the leasing period and reclaim leased resources, as well constrain the access of certain users to specific operations on the leased resources. Policies may be created via a UI that automatically generates a policy encoding. The policy is registered and accessed via a policy store. When multiple policies target a common resource, merging strategies are applied to the multiple policies. The multiple policies are ranked, merged, filtered, and any remaining conflicts are resolved to generate an effective policy that is consistent with the multiple policies and is enforced on the common resource.

19 Claims, 6 Drawing Sheets

GENERATION, ACTUATION, AND ENFORCEMENT OF POLICIES FOR RESOURCES WITHIN A DISTRIBUTED COMPUTING SYSTEM

FIELD

The present disclosure relates generally to distributed-computing systems and, more specifically, to the generation, actuation, and enforcement of policies for resources within a distributed computing system.

BACKGROUND

Modern cloud-services computing environments are increasingly complex, and can include thousands of host computing devices, storage disks, and networking components for servicing increasing numbers of clients. In many computing environments (e.g., distributed computing systems), virtualized computing resources, such as virtual machines (VMs), virtual storage disks (VSDs), and virtual networks are "leased" to tenants. The leased virtual resources may be deployed on behalf of the tenants for a finite amount of time (e.g., the lease period). After the lease period has expired, the virtual resources may be re-allocated and/or reclaimed. For example, upon expiration of the lease, the operation of the resources may be terminated such that the physical computing resources (e.g., host computing devices, physical storage disks, and physical network routers) implementing the virtual resources may be re-allocated and/or utilized by other tenants. During the lease period, various "day-2 operations", such as but not limiting to rebooting VMs, re-sizing VSDs, and various load balancing operations may be required, or at least desired.

The architectures of such distributed systems are complex (e.g., the number of physical and virtual resources is large and the large number of resources may be entangled in complex patterns). Conventionally managing the deployment (e.g., the allocation of the physical resources implementing the virtual resources), as well as the day-2 operations and relinquish and/or re-allocation of the resources upon the expiration of the lease of such complex systems, may be cumbersome and require significant manual intervention.

OVERVIEW

Described herein are methods and techniques for operating a distributed computing system that comprises a set of resources. A policy server that employs one or more processors and a memory may be configured to enable a method that comprises accessing a set of policies registered at a policy store. Each policy of the set of policies may include a rule and a scope. For each policy of the set of policies, a subset of the set of resources may be associated with the policy based on the scope of the policy. The method may further include, for each policy of the set of policies, performing an action on each associated resource of the set of resources that is associated with the policy based on the rule of the policy. In some embodiments, the scope of a policy may be determined by one or more organizations associated with the set of resources. In other embodiments, the scope of a policy may be determined by one or more subgroups of an organization (e.g., a project) associated with the set of resources.

In some embodiments, a policy server may be configured to allow access to a set of policies. New policies may also be registered to this policy server. As noted above, each policy may include a rule and a scope. The scope of each policy may determine the set of resources that the policy applies to. If a policy applies to a particular resource, some action may be performed on that resource as prescribed by the rule of that policy. In some embodiments, the scope of a policy may be indicated by one or more organizations associated with a set of resources and users. In other embodiments, the scope of a policy may be indicated by one or more projects (e.g., sub-organizations of and organization).

Some embodiments may include a method comprising selecting a first subset of the set of policies. Each policy in the first subset of policies has a first scope and is associated with a first subset of resources. An effective policy associated with the first subset of resources may be generated based on each of the policies in the first subset of policies. In some embodiments, a separate effective policy may be generated for and/or be associated with each resource, rather than a single effective policy for the entire subset of resources. Various embodiments may comprise generating a priority ordering for the first subset of policies based on one or more ordering rules. The first subset of priorities may be filtered based on one or more incompatible conditions occurring within the first subset of priorities. The filtered first subset of policies may be merged, based on the priority ordering, and an effective policy may be generated.

In various embodiments, when enforcing policies, governed resources may be independently considered. For each governed resource, policies that include the resource in their scope may be merged to iteratively generate and/or compute an effective policy. Priority orderings may be employed to determine conflict resolution in the merging process. One or more rules of the effective policy may be enforced on the governed resources. More specifically, to apply policies, some embodiments may independently consider governed resources. For each governed resource, policies that include the resource in their scope are merged into a single effective policy. Policies may be merged in a priority order determined by one or more ordering rules. The merging process may encounter incompatibilities between policies. These incompatibilities may be resolved by choosing one or more policies to discard. The policies to discard may be determined by the policies' priority ordering or other conflict resolution rules. The rules of the effective policy may then be applied to the resource. In some embodiments, it is also possible to preview the effective policy for resources without altering them by running the merging process in a speculative (or dry-run) mode A method may include providing a user interface (UI) to a user. A definition of a user policy may be received via the UI. An encoding of the received user policy may be automatically generated. The user policy may be registered in the policy store. Access to the encoding of the user policy may be provided to other users, via the policy store. Each policy in the set of policies may be encoded in a human-readable notation. The human-readable notation may include at least one of a JavaScript Object Notation (JSON) or a YAML Ain't Markup Language (YAML) notation. Each policy in the set of policies may include and/or correspond to a policy type.

In some embodiments, a first policy of the set of policies may be a lease policy type. That is, a policy of the set of policies may exist with a lease policy type. In such embodiments, the first policy may include a value for a default lease period of a first resource of the set of resources, a value for a maximum lease period of the first resource, and a value for a grace period of the first resource. In other embodiments, the first policy may be a day-2 policy type. In such embodiments, the first rule of the first policy may include an action to be performed on a first resource of the set of resource after the first resource is deployed and before a lease period of the first resource has expired. In some embodiments, a policy such as but not limited to the first policy may include an access-control list that is employable to grant privileges to specific users to execute one or more actions and/or operations. Each policy in the set of policies may include an enforcement type of at least two possible values that indicate a priority for ranking the set of policies. The two possible values may indicate how two or more policies rank relative to one another. For example, some policies may have an enforcement type of hard, while other policies have an enforcement type of soft. Policies with a hard enforcement type are generally ranked higher than policies with a soft enforcement type.

The set of resources may be governed resources. The set of resources may include at least a set of virtual machines (VMs) and a set of virtual storage disks (VSDs). In some embodiments, the scope of a policy may be further refined with the use of a composite logical statement referred to herein as 'criteria'. When applied to a resource, this statement evaluates either to "true" or to "false". If the evaluation is negative, the resource is excluded from the policy's scope. More specifically, each policy in the set of policies may include one or more logical statements (e.g., criteria) that, when applied to each particular resource in the set of resources, evaluates to true or false. The one or more logical statements may include one or more composite logical statements. The evaluation of each of the one or more logical statement is applied as a filter that narrows the scope of the policy. The first and second resources may be provided by separate resource providers (e.g., Amazon Web Services (AWS) and Microsoft Azure). The logical statements (e.g., criteria) may be employed to limit the scope of a policy to resources from one or more separate providers. Policy enforcement may be triggered by an update to a policy.

In another embodiment, a non-transitory computer-readable storage medium storing one or more programs configured to be executed by one or more processors of a policy server is provided. The one or more programs stored by the non-transitory computer-readable storage medium include instructions for operating a distributed computing system that includes a plurality of resources. The instructions include accessing a set of policies registered at a policy store. Each policy of the set of policies includes a rule and a scope. For each policy of the set of policies, a subset of the set of resources may be associated with the policy based on the scope of the policy. The method may further include, for each policy of the set of policies, performing an action on each of the resources of the set of resources that is associated with the policy based on the rule of the policy.

In still another embodiment, a distributed-computing system may include a set of resources and a policy server. The policy server may have one or more processors and memory storing one or more programs configured to be executed by the one or more processors. The one or more programs may include instructions for operating the distributed computing system. The instructions may include accessing a set of policies registered at a policy store. Each policy of the set of policies includes a rule and a scope. For each policy of the set of policies, a subset of the set of resources may be associated with the policy based on the scope of the policy. The method may further include, for each policy of the set of policies, performing an action on each of the resources of the set of resources that is associated with the policy based on the rule of the policy.

DETAILED DESCRIPTION

Figure 1A:
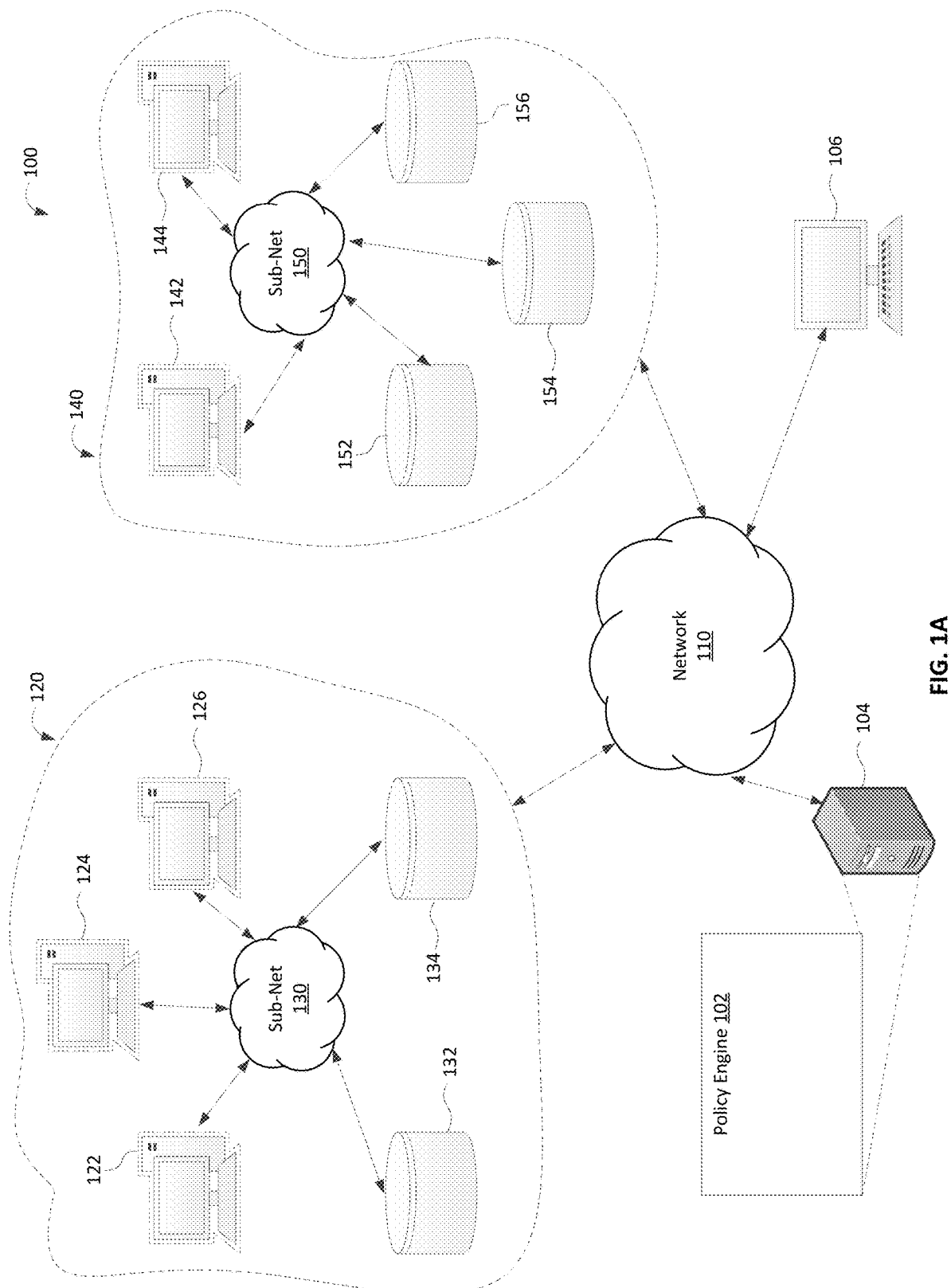
FIG. 1A is a block illustrating a non-limiting embodiment of a distributed computing system that employs one or more policies, as discussed throughout.

In the following description of embodiments, reference is made to the accompanying drawings in which are shown, by way of illustration, specific embodiments that can be practiced. It is to be understood that other embodiments can be used and structural changes can be made without departing from the scope of the various embodiments.

The herein embodiments are directed towards the generation, actuation, and enforcement of policies for resources within a distributed computing environment or system. A policy may include one or more rules for the deployment and/or operation of one or more resources in the distributed computing environment. A resource may be governed. A resource may include, but is not limited to, a set of one or more computing resources (e.g., a computing machine), storage resources (e.g., a disk drive), communication resources (e.g., a communication network), and the like. In at least some embodiments, a resource may be a virtual resource. For example, a computing resource may include one or more virtual machines (VMs), a storage resource may include one or more virtual disks (e.g., a virtual storage disk (VSD)), and a communication network may include a virtual network and/or network components. Thus, the policies discussed herein may be employed in any computing system that includes, or is implemented via hyperconverged infrastructure (HCI). As discussed throughout, policies may be employed to automate the management of the operation of resources of computing systems. More specifically, policies may be employed to automate the deployment (e.g., allocation) of resources, as well as manage actions of, and/or directed to, the resources after deployment and the termination and/or re-allocation of the resources after a use-time (e.g., a lease period) of the resources has expired.

Generally, a policy may include one or more rules. Within the policy, the one or more rules may be bundled with a scope of the policy. A rule may indicate one or more actions (or operations) to perform that affect and/or are directed towards one or more resources of a distributed computing system. Additionally and/or alternatively, a rule may impose a set of one or more constraints on one or more resources and/or one or more users that the policy targets. As a non-limiting example, a policy may limit the operations (e.g., read/write operations) that a specific user, or group of users, may perform. For instance, a policy may dictate that user_A may not delete the resource. The policy may also indicate a set of properties for the resource. For example, a policy may indicate that a resource associated with a specific user, or group of users, may include and/or be associated with one or more tags, metadata, or the like. As noted above, a resource may be a governed resource. A resource that is affected by the rule of a policy may be referred to as a target resource or target object of the policy. The scope of a policy may indicate, or otherwise be employed to determine, the target resource of the policy, e.g., a set of resources that are targeted by the particular policy. For example, the rule of a policy may indicate a rebooting schedule, temporal period, or frequency (e.g., when to power off and then power back on, or otherwise restart the operation of) a resource of the system, whereas the scope of the policy indicates which resources to reboot. A policy may indicate that each resource owned by, leased by, or is otherwise associated with a specific user, or group of users, to be periodically rebooted on a re-occurring schedule. Note that the scope of a policy may indicate multiple target resources and/or multiple resource types. For instance, a single policy may be employed to schedule the rebooting of multiple instances of VMs in the system, as well as to schedule the rebooting of multiple instances of VSDs in the system. The scopes of multiple policies employed to manage a system may include a significant overlap. Multiple policies may target the same resource. The multiple policies may include orthogonal, or at least inconsistent, rules or actions regarding the operations of the commonly targeted resources. That is, the multiple policies may include rules intended for different purposes and the effects of the multiple policies may conflict (i.e., the policies may conflict). The embodiments may include various governance mechanisms (e.g., conflict resolution strategies) to handle such situations. For example, the embodiments may merge and rank the policies (based on various factors such as but not limited to an enforcement type of each of the policies) that target one or more common resources (e.g., the same resource targeted by multiple policies). Any conflicts of policies may be resolved based on the ranking, as well as other factors.

Furthermore, the scope may indicate one or more conditions that are required for (or at least trigger) the application of the rule of the policy. In some embodiments, the scope may be directed towards one or more organizations, tenants, projects, users, resources with a specific name, or the like that is associated with various resources. For example, the scope may encompass a set of resources associated with an organization (e.g., a tenant), a project (e.g., a sub tenant), or particular users. Thus, policies may be employed to at least partially automate the management and/or operation of resources in a distributed computing system.

In the various embodiments, each resource may be "leased" to one or more "tenants" for a finite temporal period. Such a tenant or entity may include an organization or project associated with, or otherwise employing, those resources. That is, a resource may be "deployed" (e.g., temporarily allocated) for the tenant for use. Thus, the "leasee" (and/or "lessee") may be associated with the leased resource. Policies may be employed to manage the deployment of resources, as well as the return, collection, re-allocation, and/or termination of the resources after the lease has expired. After the deployment of the resource, and during the remainder of the lease period, various "day-2 operations" (e.g., reboot, resize, power off, and the like) may be performed on and/or by the leased resources. In addition to managing the deployment and expiration of a lease on a resource, policies may also be employed to manage the performance of day-2 operations on the resources. Such day-2 operations include, but are not limited to, powering on or off the resource, resizing the resource, re-booting the resource, and the like. Various policies may automate the deployment activities (including both the beginning of the lease and the termination of the lease) and day-2 operations, as well as any other management tasks associated with the resources of a distributed computing system. Thus, policies may be employed to manage the "cradle-to-grave" life cycle of resources within a distributed computing system.

In addition to one or more rules (e.g., actions) and a scope (e.g., indications of matching triggering criteria, organizations, projects or users associated with a targeted resource, and the like), a policy may be and/or may include, or otherwise be defined and/or characterized by a policy type. For example, the type of a policy may be a lease policy or a day-2 policy. Lease policies may be employed to control how long a resource is available to users (e.g., a lease policy may indicate a lease period for the resource). A lease policy may set an expiration date (or lease period) when the resource (e.g., a VM or a VSD) is deployed. For example, a lease policy may set an expiration date (or lease period) when deploying the resource. Another policy type includes day-2 policies. A day-2 policy may concern and/or be directed towards day-2 operations for one or more resources. In some embodiments, a day-2 policy may indicate which user, or group of users, may invoke certain actions on a resource. In at least one embodiment, a day-2 policy may be employed to at least partially automate any day-2 operations (resizing of the resource, powering on/off of the resource, rebooting the resource, and the like) of one or more target resources. Lease policies and day-2 policies are two exemplary and non-limiting policy types. Other policy types may include approval policies. Such approval policies may be employed for configuring which users (or class of users) may manually approve a deployment, re-allocation, or other type of action for a resource. Still another non-limiting example of policy types may include power-scheduling policies. Power schedule policies may include policies are employable to manage the power schedule (e.g., shutdown, rebooting, resizing (scaling up or scaling down) operations for resources within scope. In some embodiments, power schedule policy types may be a subset of day-2 policy types. The embodiments include policies of policy types other than lease policy types, day-2 policy types, approval policy types, and power schedule policy types The various embodiments may provide a policy store. The policy store may enable a user to generate or create new policies and/or new policy types. The user may register their policies and/or policy types in the policy store and make them available to other users. Furthermore, the user may access policies and policy types registered by other users, and employ the policies and policy types created by other users to the resources in their computing system.

As noted above, the scope of a policy may be at least partially defined via the organization that is leasing the target resource and/or the project that is leasing the resource. For example, the scope of a policy may indicate that the policy is to be applied to resources leased by a particular organization and/or a particular project (or a particular user associated with the target resource). The criteria may be encoded in expressions that evaluate to True or False (e.g., 1 or 0). Thus, criteria may include Boolean expressions. Such expressions may be a composite of sub-expressions. The expressions of the criteria may be employed as and/or act as filters for determining which resources fall within the scope of the policy, based on the evaluations of the criteria. The criteria may be employed to narrow the scope of the policy. In some embodiments, a resource may be tagged via tags. That is, a targeted resource may be associated with, or include, one or more tags (e.g., a business critical tag). The criteria of a policy may be employed as a customizable filter. The filters may dictate, as to which resources a policy targets, or is otherwise applied. That is, the filters may be employed to narrow the set of resources that are targeted via the policy. For example, by requiring matching resources to have and/or be associated with certain tags. The expressions may be encoded in JavaScript Object Notation (JSON) or YAML Ain't Markup Language (YAML) notation employing field (or data object) names, operators, and values. Such operators may include but are not limited to equal, not equal, greater than, less than, and the like. Clauses of the criteria may be combined via AND, OR, XOR, NOT AND, NOT OR, and other logical operations The clauses of the criteria may be combined via one or more logical operations to create a composite filter, a hierarchy of filters, and/or a nesting of multiple filters that limits the scope of the policy.

A policy engine (which may include, or at least be in communication with, the policy store) may enable generation (or creation), actuation, and enforcement of policies. Policies may be encoded in human readable notation, such as but not limited to JSON or YAML notation. More specifically, a policy may be encoded via a human readable declarative definition of intent, which is not dependent on a specific coding language and does not include code and/or code segments of code (e.g., code snippets). A policy (and thus its encoding) may be based on one or more parameter-based policy schemas, such that the values for the parameters, along with the schema, define the definition of the policy. The parameterizable schema-based definitions of policies may provide standardizations for the policies across multiple domains and/or across multiple cloud-service provider platforms (e.g., Amazon Web Services (AWS), Azure, Google Cloud, and the like).

Because of standardizations in the encoding of a policy, the encoding of a policy may be automatically enabled via a user interface (UI), such as but not limited to a graphical user interface (GUI) provided by the policy store. That is, a user may interact with a GUI to provide the values for various parameters of a policy schema, and the policy store may automatically generate the encoding of the policy. The policy engine may provide one or more GUIs to facilitate the generation and encoding of policies. In addition to policies, the policy engine may enable the user to create new policy types. A multi-tenanted policy store may be employed to make pre-created heterogeneous policies and/or policy types available to users. For example, a user may create or generate a policy (e.g., via the GUI) and the user may register the policy in the policy store.

In addition to the policy store, the policy engine may include a policy actuator that actuates and/or applies the policies based on the scope of the policies within the policy store. For example, the engine may search for all the policies that are being employed and their scope applying to one or more particular resources. Once the set of relevant policies has been determined, the policy actuator may perform various computations to determine how the resources are manipulated based on relevant policies and the scopes of the existing policies. One such computation includes the ranking and merging of multiple policies that are to be applied to the resources in a given system. For example, once the set of relevant policies has been identified, the policy engine may rank the relevant policies based on one or more conditions (e.g., an enforcement type of a policy, the breadth of the scope of the policy, and the like). The policy engine may also resolve conflicts between multiple policies that affect the same resources in inconsistent or different ways based on the ranking and merging of policies. That is, the policy engine may resolve conflicts between orthogonal or inconsistent policies targeting common resources. Conflict resolution may be based on the ranking of the merged relevant policies. The ranking, merging, and/or conflict resolution capabilities of the policy engine may be referred to as effective policy computation.

The conflict resolution, as well as the ranking and merging, mechanisms of the policy engine may employ a deterministic approach that generates a single effective policy (or multiple effective policies). In some embodiments, policies with orthogonal actions and/or conflicting rules that are low-ranked may be vetoed or removed from the set of policies that are being merged, ranked, and conflict-resolved. The policy engine may also provide a preview mode, which indicates to the user the effects of adding and/or updating a policy. For example, the preview mode may provide a list view of each of the effects on the ranking, merging, and conflict resolution that follow from adding and/or updating one or more policies.

The various embodiments may be employed to enhance the performance and/or functionality of computing systems. The employment of policies to manage both the leasing (e.g., deployment and reclaiming) of system resources, as well as managing various day-2 operations allows for the more efficient allocation, operation, and re-allocation of the system's resources. As a non-limiting example, using a policy, as discussed herein, to manage the lease of a resource that was allocated may enable providing that resource via a demand-based trigger. The resource may be efficiently allocated and deployed to the user that expresses the demand, and may be efficiently de-allocated, re-allocated, and/or retired when the demand ceases. Furthermore, policies can be employed to schedule the invocation of specific day-2 operations (e.g., power-off at 9 pm, power-on at 6 am). Policies may also be employed to increase or decrease the amount of physical resources allocated to the governed resources. Thus, the resources are more efficiently utilized. For example, by employing a policy to downsize a resource (e.g., a VSD) after a larger version of the resource is no longer needed, the portion of the resources that are no longer needed may be re-allocated and directed towards other tasks. Thus, the performance and/or functionality of the distributed computing system is enhanced.

Turning now to FIG. 1A, FIG. 1A is a block illustrating a non-limiting embodiment of a distributed computing system 100 that employs one or more policies, as discussed throughout. Non-limiting computing system 100 may, but need not, include one or more sub-systems. As shown in FIG. 1A, computing system 100 includes a first computing sub-system 120 and a second computing sub-system 140.

Each of the sub-systems may include one or more resources. One or more of the resources may include a virtual resource. For example, first sub-system 120 includes a first virtual machine (VM) 122, a second VM 124, and a third VM 126. First sub-system 120 may also include a first virtual storage disk (VSD) 132 and a second VSD 134, and a first virtual sub-communication network 130. However, FIG. 1A is not intended to be limiting, and at least one of the resources may be a physical resource (e.g., a physical computing device, a physical storage disk, or a physical communication network). As shown in FIG. 1A, first sub-network 130 may communicatively couple the resources of first sub-system 120. First sub-network 130 may be a virtual communication network (VCN).

Second sub-system 140 may include a fourth VM 142, a fifth VM 144, a third VSD 152, a fourth VSD 154, a fifth VSD 156, and a second sub-network 150 that communicatively couples the resources of second sub-system 140. Similar to first sub-network, second sub-network 150 may be a VCN. The sub-systems 120/140 may be communicatively coupled via communication network 110, which may, but need not, include one or more VCNs. Thus, at least some of the resources of first sub-system 120 may be communicatively coupled to at least some of the resources of second sub-system 140, via network 110. Some of the resources distributed across system 100 may be provided via separate service providers. For example, some of the resources may be provided by a first cloud-computing vendor (e.g., Amazon Web Services (AWS)), while other resources may be provided by a second cloud-computing vendor (e.g., Microsoft Azure). Other cloud-computing vendors, such as but not limited to Google Cloud Platform, may provide other resources within system 100.

Distributed computing system 100 may include and/or employ the services of a policy engine, such as but not limited to policy engine 102 to generate, actuate, and enforce one or more policies for the resources in system 100. In some embodiments, the policy engine 102 may be a policy server or a policy module. A computing device, such as but not limited to policy server computing device 104 may host, implement, or otherwise execute the operations of a policy engine. In a non-limiting embodiment, the computing device that implements policy engine 102 may be a VM. Policy engine 102 may communicate with each of the resources via network 110, as shown in FIG. 1A.

Figure 3:
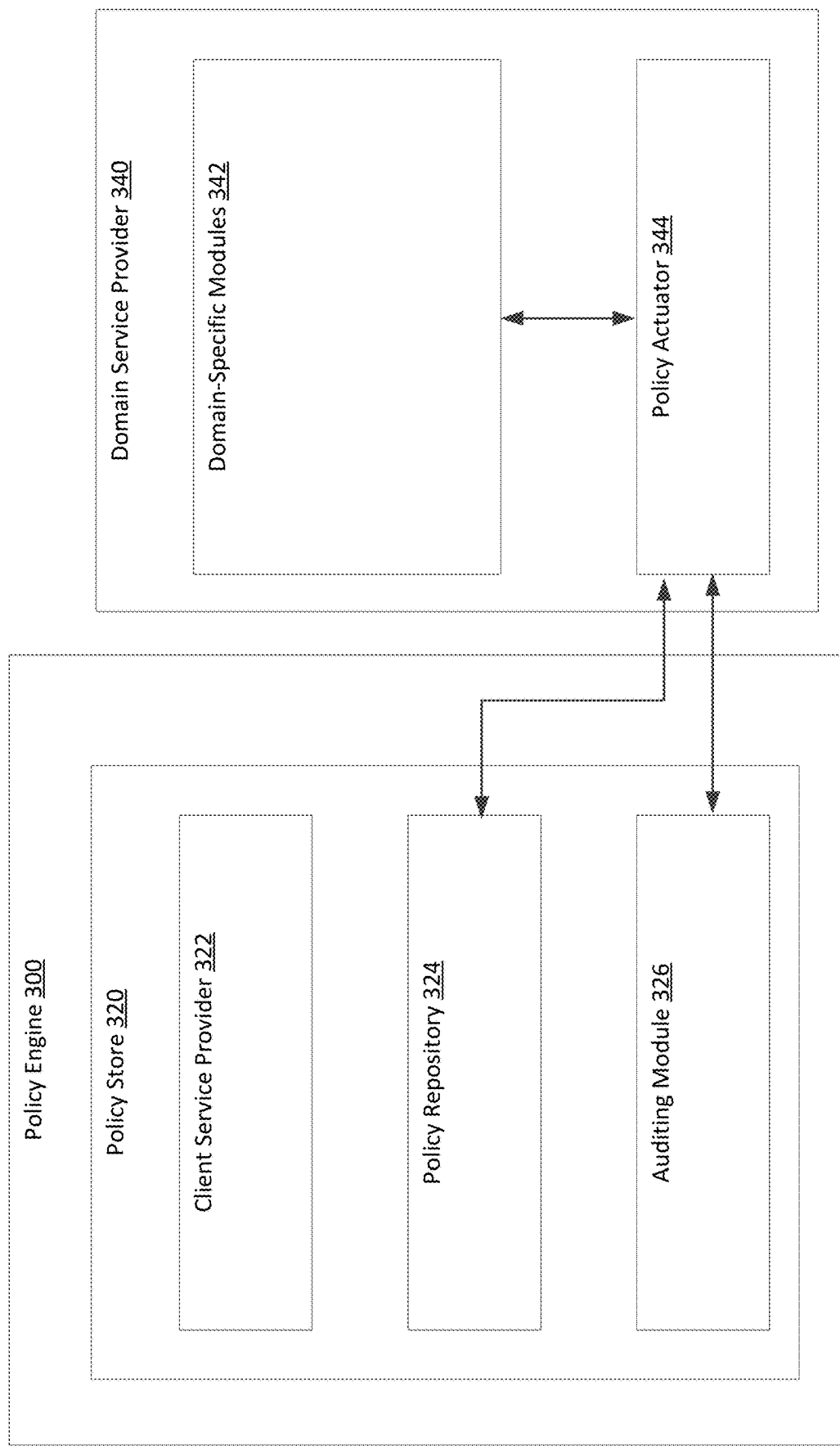
FIG. 3 is a block diagram illustrating a policy engine for generating, actuating, and enforcing policies on the resources of a distributed computing system, in accordance with some embodiments.

Various embodiments of policy engine 102 are discussed in conjunction with at least policy engine 300 of FIG. 3. Thus, policy engine 102 may include similar features, functions, and/or operations to policy engine 300. Briefly, here, policy engine 102 may enable users to create and/or select policies for the management of the operations of system 100. That is, via policy engine 100, a user may select one or more policies registered in a policy store of the engine (or create new policies) to apply to the resources of system 100. In short, policy engine 102 may enable the generation (or selection of), actuation, and enforcement of policies for the resources of system 100. As discussed throughout, the policies may automatically manage the deployment of the resources (e.g., the allocation of the resources), as well as the day-2 operations (e.g., rebooting, re-sizing, and the like) for the management of the resources during the resources' lease and the retirement of the leased resources (e.g., the termination and/or re-allocation activities). Users may employ various computing devices, such as but not limited to policy client computing device 106, to interact with policy engine 102 (e.g., employ user interfaces provided by policy engine 102 to create new policies or select existing policies to manage resources), as well as employ any of the resources of system 100. Note FIG. 1A illustrates the policy engine 102 employed in a cloud and/or cloud-computing environment, where software may be provided as a service. That is, the various embodiments may apply policies to distributed-computing, cloud computing, and/or software as a service (SaaS) environments. However, the embodiments are not so limited, and the policy engine 102 and its functionality may be implemented in less distributed computing systems, such as but not limited to local area network (LAN) systems, peer-to-peer networks, private networks, and the like. Various embodiments of computing devices, such as but not limited to policy server computing device 104 and policy client computing device, are discussed in conjunction with computing device 160 of FIG. 1B. Also note that computing device 160 may host, implement, and/or instantiate any of the resources of FIG. 1A. For example, as discussed in conjunction with at least FIGS. 1B-1C, host-computing device 160 may implement any of the various VMs and VSDs included in system 100.

Figure 1C:
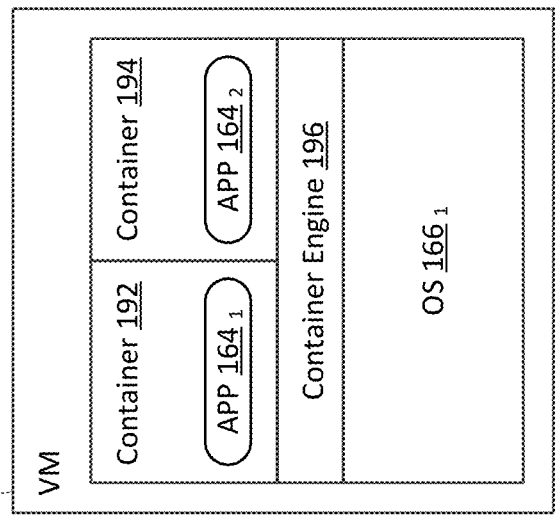
FIG. 1C is a block diagram illustrating a containerized application framework for implementing various components of the distributed-computing system of FIG. 1A, in accordance with some embodiments.
Figure 1B:
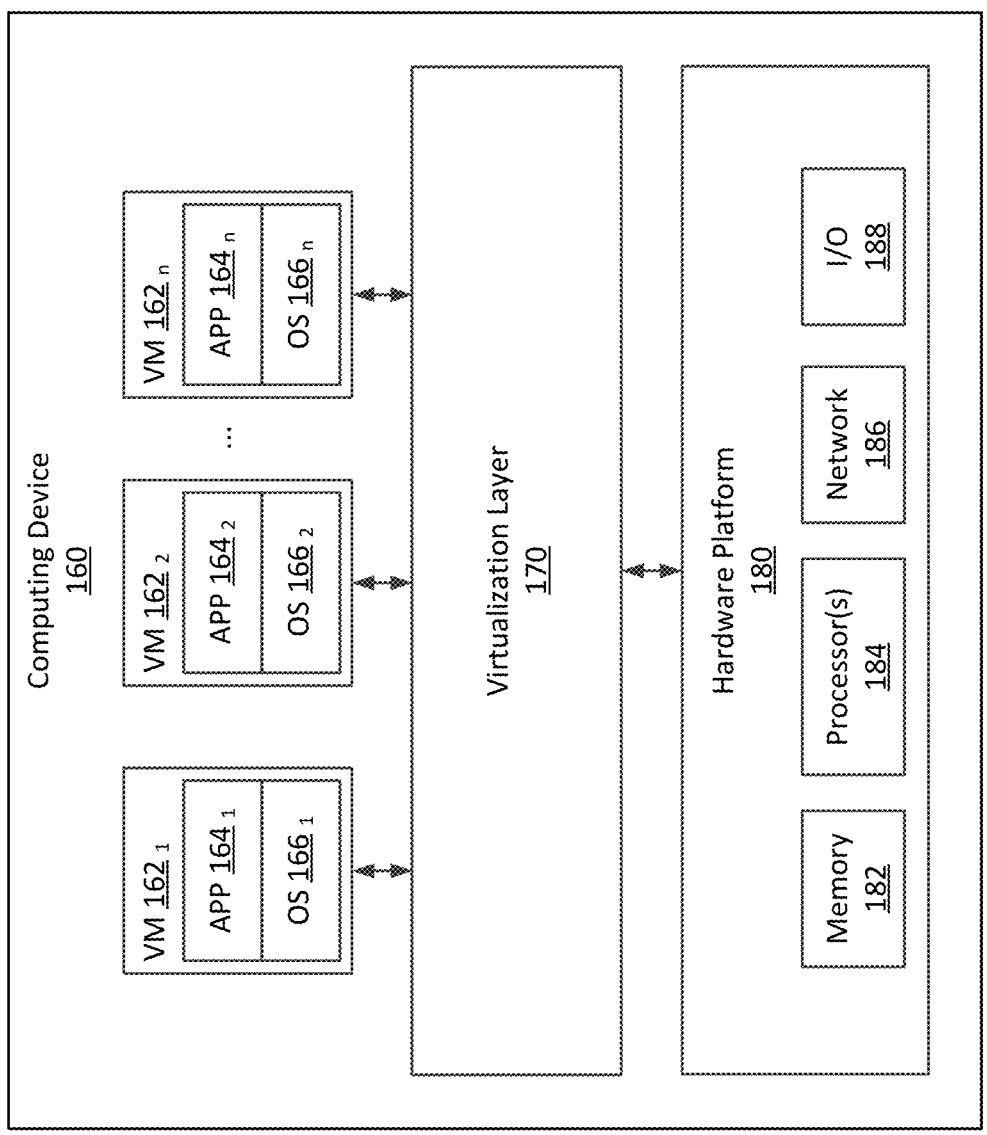
FIG. 1B is a block diagram illustrating a computing device for implementing various components of the distributed-computing system of FIG. 1A, in accordance with some embodiments.

FIG. 1B is a block diagram illustrating computing device 160 for implementing various components (or resources) of the distributed-computing system 100 of FIG. 1A, according to some embodiments. As such, policy server computing device 104 and/or policy client computing device 106 may include similar components, features, and the like. For example, policy server computing device 104 may include at least hardware platform 180 discussed below. Computing device 160 may host policy engine 102. In some embodiments, computing device may host and/or implement various resources of system 100, such as but not limited to the virtual machines (VMs) and/or the virtual storage disks (VSDs). As shown in FIG. 1B, virtual machines (VMs) $162_1, 162_2 \ldots 162_n$ are instantiated on computing device 160. In such embodiments, computing device 160 may be a host-computing device. In some embodiments, host computing device 160 implements one or more elements (or resources) of a distributed-computing system (e.g., distributed-computing system 100 operating in a client computing environment and/or a cloud-services computing environment described with reference to FIG. 1A). Hardware platform 180 includes memory 182, one or more processors 124, network interface 186, and various I/O devices 188. Memory 182 includes computer-readable storage medium. The computer-readable storage medium is, for example, tangible and non-transitory. For example, memory 182 may includes high-speed random access memory and/or non-volatile memory, such as one or more magnetic disk storage devices, flash memory devices, or other non-volatile solid-state memory devices. In some embodiments, the computer-readable storage medium of memory 182 stores instructions for performing the methods and processes described herein. Memory 182 may be employed to instantiate a storage disk, such as but not limited to a virtual storage disk (VSD). In some embodiments, hardware platform 180 also includes other components, including power supplies, internal communications links and busses, peripheral devices, controllers, and many other components.

Virtualization layer 170 is installed on top of hardware platform 180. Virtualization layer 170, also referred to as a hypervisor, is a software layer that provides an execution environment within which multiple VMs 162 are concurrently instantiated and executed. The execution environment of each VM 162 includes virtualized components analogous to those comprising hardware platform 180 (e.g. a virtualized processor(s), virtualized memory, etc.). In this manner, virtualization layer 170 abstracts VMs 162 from physical hardware while enabling VMs 162 to share the physical resources of hardware platform 180. Because of this abstraction, each VM 162 operates as though it has its own dedicated computing resources.

Each VM 162 includes operating system (OS) 166, also referred to as a guest operating system, and one or more applications (Apps) 164 running on or within OS 166. OS 166 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 166 provides the interface between Apps 164 (e.g., programs containing software code) and the hardware resources used to execute or run applications. However, in this case, the "hardware" is virtualized or emulated by virtualization layer 170. Consequently, Apps 164 generally operate as though they are in a traditional computing environment. That is, from the perspective of Apps 164, OS 166 appears to have access to dedicated hardware analogous to components of hardware platform 180. Policy engine 102 may be an instance of an app 164 that execute by, implemented by, and/or hosted by one or more of the VMs 162.

FIG. 1C is a block diagram illustrating a containerized application framework for implementing various components of a distributed-computing system, in accordance with some embodiments. More specifically, FIG. 1C illustrates VM 162₁ implementing a containerized application framework. Containerization provides an additional level of abstraction for applications by packaging a runtime environment with each individual application. Container 192 includes App 164₁ (e.g., application code), as well as all the dependencies, libraries, binaries, and configuration files needed to run App 164₁. Container engine 196, similar to virtualization layer 170 discussed above, abstracts App 164₁ from OS 1661, while enabling other applications (e.g., App 164₂) to share operating system resources (e.g., the operating system kernel). Because of this abstraction, each App 164 runs the same regardless of the environment (e.g., as though it has its own dedicated operating system). In some embodiments, a container (e.g., container 192 or 194) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers could be used without departing from the scope of the various described embodiments.

Figures 2A, 2B:
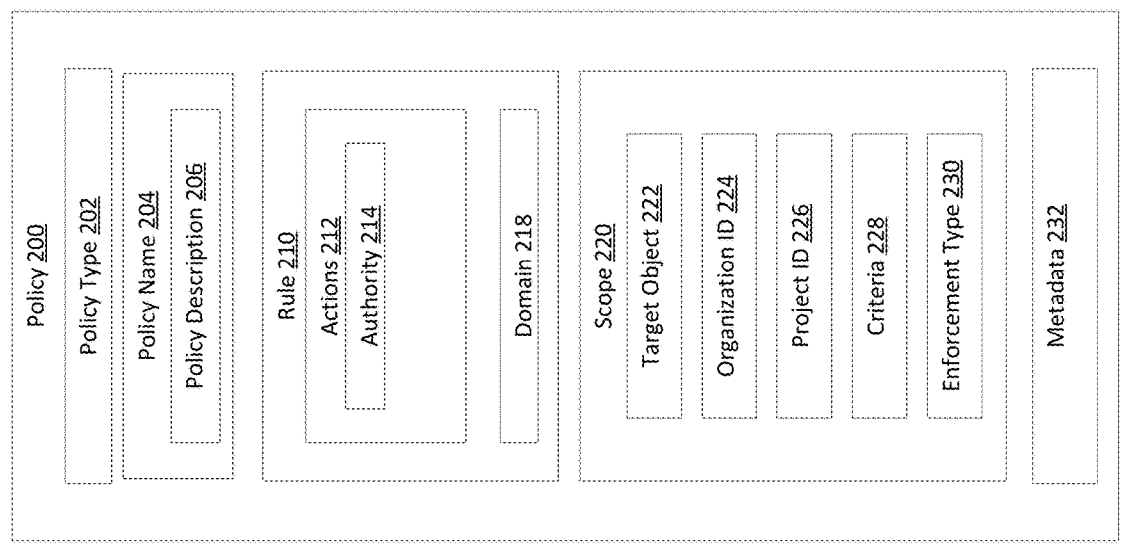
FIG. 2A is a block diagram illustrating a non-limiting example of a policy, in accordance with the various embodiments.
FIG. 2B provides a non-limiting example of a human-readable encoding of a policy, in accordance with the various embodiments.

FIG. 2A is a block diagram illustrating a non-limiting example of a policy in accordance with the various embodiments. Policy 200 may include one or more rules that enable the automatic management of various resources, such as but not limited to any of the resources discussed in conjunction with system 100 of FIG. 1A. A policy engine, such as but not limited to policy engine 102 of FIG. 1A and/or policy engine 300 of FIG. 3 may be employed to generate (or create), actuate (or apply), and enforce policy 200. A policy, such as but not limited to policy 200, may include one or more rules 210 bundled with a scope 220 that may be employed to identify or determine which resources to apply or direct one or more actions defined by the one or more rules 210. As such, policy 200 may include a plurality of features, aspects, or characteristics that indicate (or encode) a definition of policy 200. More generally, a policy may be declaratively defined to encapsulate one or more rules, where the definition need not include procedural programming or involve a specific programming language. A policy may be a heterogeneous policy that is portable between resources, subsystems, systems, as well as various cloud service providers (e.g., AWS, Azure, and the like).

A policy definition may be based on a policy definition model (e.g., a schema) that includes one or more domain-specific definitions. Each of the domain-specific definitions of a policy may be constrained via a policy schema for the policy. The definition of a policy (e.g., the features, aspects, or characteristics) of a policy may be encoded in one or more structured data or object formats, such as but not limited to JavaScript Object Notation (JSON) or YAML Ain't Markup Language (YAML). At least some of the features, aspects, or characteristics of policy 200 are shown in FIG. 2A. A non-limiting encoding of an exemplary, but non-limiting, embodiment of a policy is shown in FIG. 2B. Accordingly, to interpret the encoding 240, a user may need only minimal knowledge of the domain of the policy. Note that the encoding 240 of FIG. 2B is human readable and is not a programming code snippet. Furthermore, as discussed throughout, the encoding 240 of FIG. 2B may be automatically generated via one or more graphical user interfaces (GUI). Note that the encoding 240 may include one or more field (or name) value pairs, where the field (or data name) is on the left side of a delimiter or delimiting character (e.g., ":") and the corresponding value for the field (or data name) is on the right side of the delimiter. Note that the encoding may include nested field value pairs to form a nested structured data object for the policy definition. Also, note the correspondence between the features, aspects, or characteristics of the definition of policy 200 and encoding 240.

Policy 200 may include a policy type 202. Some non-limiting examples of a policy type include a lease policy type and a day-2 operations policy type. In general, a policy of a lease policy type may be employed to control how long one or more resources are deployed and/or are made available to users. For example, enforcing a lease policy may result in constraining, or otherwise determining, when one or more resources are terminated, destroyed, re-allocated, or otherwise taken offline after 30 days of deployment, unless a user extends the lease on the resource. In contrast, day-2 type policy may be employed to control what actions are available to certain users to manipulate resources. For example, a day-2 policy may enable (or prohibit) a user from turning on, turning off, or resizing a resource once it is deployed. As discussed throughout, users may create other policy types and register them within a policy store, such as but not limited to policy store 320 of FIG. 3.

Other features of a policy include, but are not limited to a policy name 204 (or other identifying string or value for the policy). In some non-limiting embodiments, name 204 may include a description 206, which may include a more descriptive string than policy name 204. As noted above, policy 200 may include one or more rules 210. Rule 210 may include one or more actions 212 (deploy, allocate, reallocate, power on, power off, resize, delete, and the like) that are allowed for certain users because of policy 200.

Each policy type may be dedicated to a particular problem domain (e.g., deployment scheduling policy vs. tagging policy), which rules each type supports are specific to that domain. In some embodiments, the domain may be implicit in the policy type. In such embodiments, there may be no field within the policy that indicates the domain. Thus, in addition to actions 212, rule 210 may be domain specific, and thus include or be associated with one or more domains 218. As noted above, in some embodiments, policy 200 may not include domain 218. A specific rule schema may exist for each policy type. A rule may be expressed or encoded in business terms that may or may not directly map to a desired state of the target object or resource. Furthermore, the encoding of a rule may be user readable. Accordingly, the user may only be required to have only minimal knowledge of the domain of the rule. In some embodiments, the one or more target objects 222 may be determined and/or identified based on scope 220, while in other embodiments the target object 222 may be included in rule 210. In some embodiments, the target object 222 may not include a target object. For instance, the scope 220 (including the criteria 228) may be employed to determine the target object 222. Actions 212 may also include one or more authorities (e.g., administrator, specific users, and the like) that are enabled to invoke the performance of actions 212, which may affect one or more targets.

As noted above, policy 200 may include a scope 220 bundled with the one or more rules 210. Scope 220 may define scope of applicability of policy 200. In general, each policy may include a scope that indicates which resources are governed via the policy. The definition of scope 220 may be normalized and/or be at least similar for all policy types. The scope may be defined via the target object 222, an organization ID 224, a project ID 226 custom criteria 228, and/or an enforcement type 230. For example, policy 200 may be applied to all resources that are associated with the organization ID 224 and/or the project ID 228. As discussed below, policy 200 may be applied to all resources, for which one or more logical expressions included in criteria 228 evaluate to true. The custom criteria 228 include additional conditions that may narrow the definition of the scope 220 of policy 200. Although not shown in FIG. 2A, policy may include one or more tags (e.g., a business critical tag, a tag indicating a cost or other value associated with the policy, and the like). Criteria 228 may include one or more filters on resource tags (or any other resource attributes), via logical statements that evaluate to true or false. In general, the one or more rules 210 may be applied when at least one or more of the aspects of the scope 220 definition are satisfied. In at least one embodiment, all aspects of the scope 220 must be satisfied but the resource for the policy 200 to target the resource.

Scope 230 may also include an enforcement type 230. In some embodiments, enforcement type 230 may indicate a hard policy or a soft policy. A soft policy may indicate default policy definitions, which may be overridden. For example, an administrator may create a soft policy that may be overridden at the organization or project level. In contrast, the values included in the definition of a hard policy may not be overridden by users employing the policy. When ranking and merging policies, hard policies are generally ranked higher than soft policies.

Policy 200 may additionally include various metadata 232. Such metadata 232 may include, but is not limited to an indication of a timestamp associated with the creation of policy 200 and/or an indication of a user responsible for the creation of policy 200. Metadata 232 may additionally include an indication of a timestamp associated with one or more previous edits (or updates) of policy 200 and/or an indication of one or more users associated with the one or more previous edits, and the like.

FIG. 3 is a block diagram illustrating a policy engine 300 for generating, actuating, and enforcing policies on the resources of a distributed computing system, in accordance with some embodiments. Policy engine 102 of FIG. 1A may be similar to policy engine 300 of FIG. 3. Accordingly, policy engine 300 may be employed by distributed computing system 100 of FIG. 1A. Policy engine 300 may be at least partially implemented by a computing device, such as but not limited to policy server computing device 104.

As shown in FIG. 3, policy engine 300 includes a policy store 320 and may be in communication with a domain service provider 340. The communication may be through a communication network, such as but not limited to network 110, sub-network 130, and/or sub-network 150 of FIG. 1A. In a non-limiting embodiment not shown in FIG. 3, the domain service provider 340 may be included in policy engine 300. In at least one other embodiment, the domain service provider 340 may be separate from the policy engine 300; however, the policy actuator 344 (shown in FIG. 3 as being included in domain service provider 340) is included policy engine 300, rather than being located in the separate domain service provider 340. In general, policy store 320 may be responsible for enabling a user to generate (or create) policies (or new policy types), register their policies (and/or policy types) within the policy store 320, and access their (or other) registered policies from the policy store 320. By accessing registered policies, users may select which policies to employ in the management of resources in one or more distributed computing systems, such as but not limited to system 100. In contrast, policy actuator 344 may be generally responsible for actuating (or applying), as well as enforcing the policies on the resources of a computing system. As noted above, in some embodiments, the policy actuator 344 may be included in domain service provider (340), while in other embodiments; policy actuator 344 may be included in policy engine 300. Policy actuator 344 may be responsible for ranking and merging policies, as well as policy conflict resolution (e.g., the effective policy computation 344 of policy engine 300 and/or domain service provider 340). As such, policy store 320 may be agnostic to the domains of the various policies registered within the policy store 320, whereas the policy actuator 344 340 may employ domain-specific knowledge for its operations.

Policy store 320 may be a multi-tenanted policy store for heterogeneous policies, such as but not limited to policy 200 of FIG. 2A. Policy store 320 may enable the registration of new policies and/or new policy types. Policy store 320 may additionally enable the creation, deletions, and editing/updating of policies and policy types. Policy store 320 may include a client service provider 322, a policy repository 324, and an auditing module 326. Client service provider 322 may be generally responsible for providing one or more user interfaces (UIs), such as but not limited to a graphical user interface (GUI), as well as various application programming interfaces (APIs) to users or clients of policy engine. For example, client service provider 322 may provide a GUI (or an API), such as but not limited to GUI 400 of FIG. 400, to enable a user to generate or create a new policy, as well as to register and/or access policies within the policy store. The policy repository 324 may include a searchable database to store and access policies registered at policy store 320. The auditing module 326 may be generally responsible for performing logical operations regarding the auditing of policies, as well as compiling various statistical metrics associated with the registered policies. Thus, auditing module 326 may be a logic module.

Policy store 320 may also determine which of the registered and/or selected policies are in scope of a specific resource. Whether the actuator 344 is included in the policy engine 300 or the domain service provider 340, the actuator 344, may actuate and/or enforce the in-scope policies. Policy store 320 may additionally monitor the policies for updates and/or edits and notify one or more domain-specific actuators (e.g., policy actuator 344) of such updates. The notified actuator may adjust its enforcement of the updated policies such that a continuous compliance of the updated policy is enforced. Via the logic module 326, policy store 320 may perform various determinations regarding the auditing and enforcement of the policies and generate. As such decisions, or other related events, may be compiled and indicated in one or more log files. Such log files may be searchable.

Policy store 320 may also enable a preview mode when updating and or creating policies. In some embodiments, the actuator 344 may at least partially enable a determination of whether the preview mode for a specific policy type is available. When the policy preview mode is entered, a "dry run mode" or simulation mechanism may be invoked to determine the ranking, merging, and conflict resolution of the affected policies. The results of the preview mode may be provided to a user, without actually invoking the updates or actuating the new/updated policies. Thus, a user may preview the consequences of the creation of new policies, as well as the consequences of editing or updating pre-existing policies.

Domain service provider 340 may provide domain-specific services for the generation, actuation, and enforcement of the policies. As such, domain service provider 340 may include one or more domain-specific modules 342 and a policy actuator 344. In at least one embodiment, a specific actuator may exist, policy type, policy actuator 344 may at least partially enforce and apply (or actuate) the policies to the resources. As such, policy actuator 344 may at least partially enable the policy ranking, merging, and conflict resolution services of policy engine 300.

As noted throughout, a user may create and register new policies and new policy types in policy store 320. Creating a new policy type may include generating a specification for a domain-specific type of policy. Such a policy type specification may include a schema for the policy definition that includes differentiable attributes of a policy's target resource or object (e.g., the resource that is to be governed by the policy). Because the governed resources may be domain-specific, the attributes (and thus the schema) may be domain-specific. A schema may include field-value pairs. The domain-specific schemas may include API references to access eligible values for a given field in the schema. For example, an API call may be employed to look-up names of existing templates that include fields and eligible values for the fields.

When registering a policy type, a link, such as but not limited to a uniform resource locator (URL) may be provided to access the actuator for the policy. In some non-limiting embodiments, to enforce a registered policy, the corresponding policy actuator may be invoked via a REST API at the provided URL. When invoked, the actuator may perform various computations that determine how the target resources are manipulated based on associated policies and the scope of the policies. As shown in FIG. 3, policy actuator 344 may communicate with the policy repository 324 and auditing module 326 to read the relevant policies, publish decisions to an audit log, and communicate to the user that the policies have been enforced or that preview results are ready to be viewed. Each actuator implementation for a policy may include its own effective policy computation logic that is employed by auditing module 326.

As discussed throughout, multiple policies may target one or more common resources, where the rules of the multiple policies may be orthogonal, or at least inconsistent. Separate stakeholders may configure policies for different agendas or desired states of the system. For example, one administrator may want one or more policies applied to all resources that are above (or below) a cost threshold, another administrator may want other policies applied to all deprecated (or disapproved) resources, while still another administrator may want still other actions applied to all resources at a specific endpoint in the network. As another non-limiting example, one user may create an approval policy to indicate the different approval steps for resource requests matching specific criteria. Another user may create another policy of another lease policy to configure maximum lease and grace periods. Still another user may create a still another policy to configure different power schedule actions (e.g., rebooting, scaling-up, scaling down, or other such resizing operations, and the like). All three policies of differing policy types (and different and perhaps inconsistent actions) may be deployed and target one or more common resources. Thus, the multiple policies, if applied naively may generate separate, different, and/or non-deterministic results. In some embodiments, the conflict resolution mechanism may be applied to policies of the same policy type. In other embodiments, conflict resolution may be applied to policies of differing policy types.

As noted throughout, the embodiments, via policy engine 300, may provide deterministic effective policy computation for such scenarios that involve competing and/or inconsistent policies applied to common resources. The competing policies (that is, a set of policies that apply to one or more common resources) may first be identified based on the scope of each policy that is selected to be applied for a system. The set of competing (or relevant) policies may be ranked via one or more priority levels. One priority level for a given policy may be the breadth of the scope of the given policy. In some embodiments, organization level-based scopes may be considered broader than project level-based scope (e.g., because an organization may associated with multiple projects). Thus, policies where the scope is defined via the organization-level may be ranked higher than policies where the scope is defined via the project-level. Policies where the enforcement type is set hard may be ranked higher than policies where the enforcement type is set to soft. In at least some embodiments, a timestamp indicating a creation or updating of a policy may be employed to determine the ranking of the policies. In some embodiments, newer policies may be generally ranked higher than older policies. In other embodiments, older policies are generally ranked higher than newer policies. In some embodiments, the ranking may be based on a priority of the ranking factors. For instance, the ranking may be first performed via the organization/project factor. The enforcement type discrimination may be applied to similar ranking policies that share a common organization/project-level base ranking. Finally, the creation/updating timestamp factor may be applied for further sorting of the rankings of policies with similar organization/project level rankings and similar enforcement type rankings.

After the set of relevant policies has been ranked, the ranked set may be merged. To begin merging the ranked set of relevant policies, the highest ranked policy of the set of ranked relevant policies may be employed as a baseline for an effective policy. Starting with the second highest ranked policy, each of the lower ranked policies are merged, one at a time with the current effective policy. In some embodiments, as many policies as possible are merged with the current effective policy, such that the current effective policy is iteratively updated during the merging process. If a lower ranked policy is determined to be incompatible with the current effective policy, that policy may be tagged as a conflicting (or incompatible) policy and may be vetoed or discarded from the merging process. Thus, in these embodiments, incompatible policies are ignored. However, in other embodiments, an incompatible policy may be altered, updated, and/or edited such that it becomes consistent with the current effective policy. Merging the relevant policies may include merging the values of corresponding fields of the relevant policies. For example, two separate policies in the set of relevant policies may have different values for the field of maximum lease period. The value for the field in the current effective policy may be set to the lesser of the two different values. In some embodiments, the value for the higher ranked policy may be employed to set the value for the current effective policy.

In the various embodiments, the computing system that the set of relevant policies is applied to may be kept in continuous compliance, via various governance and enforcement triggers. The effective policy computation and application of the policies (e.g., the ranking, merging, and conflict resolution) may be triggered when one or more of the relevant polices is updated or a trigger event occurs in the system. For example, when a policy is updated, the policy store 320 may notify the relevant actuators 344. The actuators 344 may start an enforcement cycle to keep the system in compliance with the updated policy. For event-based triggers, an enforcement cycle may be triggered based on the detection of one or more events at one or more resources. For example, an enforcement cycle may be triggered when an instance of a deployments is created (e.g., at the beginning of a lease period), or when a request is submitted (requiring one or more actions from one or more approval policies).

Figure 4:
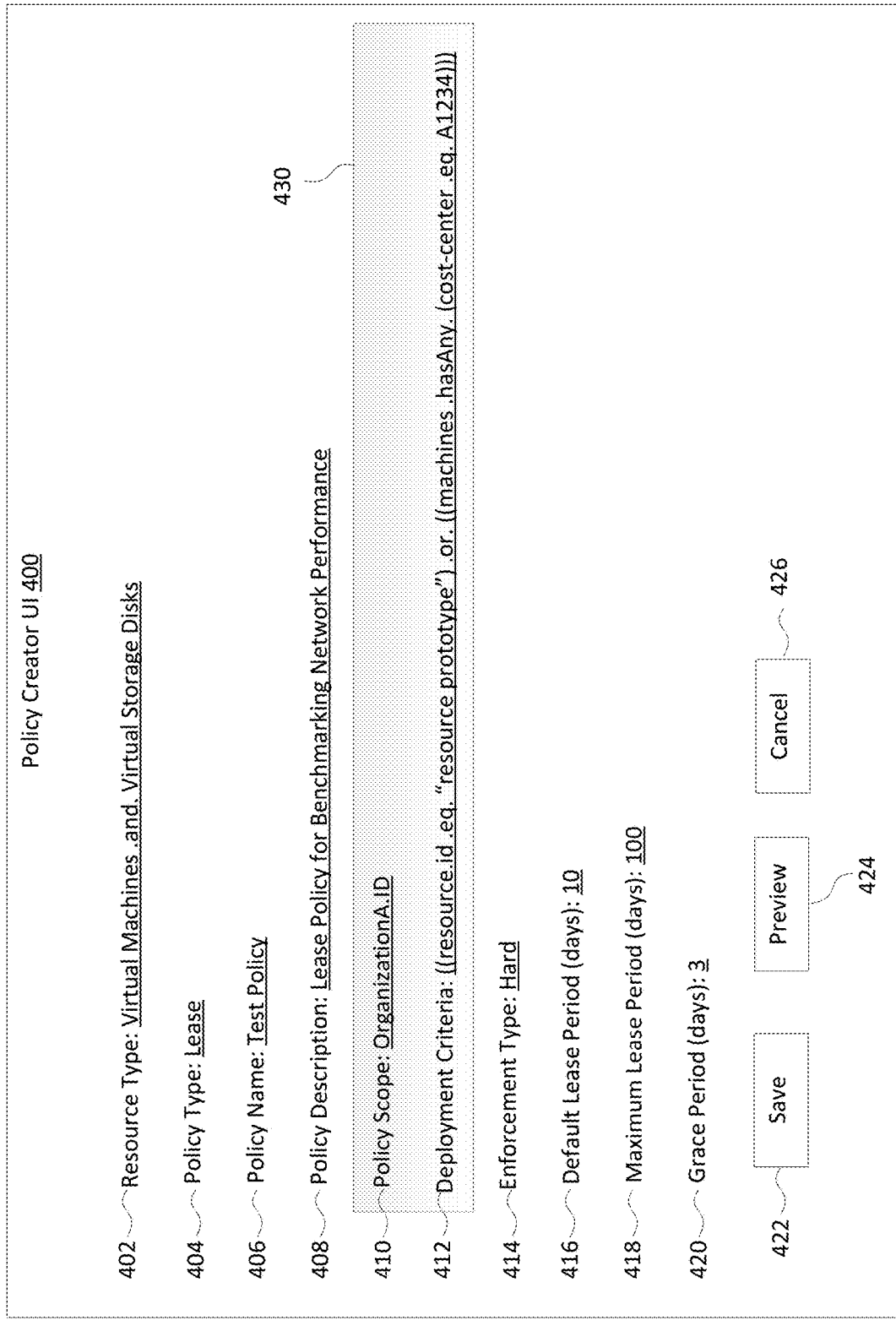
FIG. 4 is a block diagram illustrating policy creator UI for generating policies, in accordance with some embodiments.

FIG. 4 is a block diagram illustrating policy creator UI 400 for generating policies, in accordance with some embodiments. UI 400 may be a graphical user interface (GUI). GUI may be provided by a policy store, such as but not limited to policy store 320 of FIG. 3. A user may employ GUI 400 to create new policies, such as but not limited to policy 200 of FIG. 2A. A user may register a new policy in the policy store. Note that GUI 400 provides the user with a plurality of fields, for which the user may provide values for each field. The policy may be automatically created based on the user provided values for the various fields. In at least one embodiment, an encoding of the policy, such as but not limited to encoding 240 of FIG. 2B may be automatically generated based on the value of the fields. The fields provided by GUI 400 may be based on one or more policy schemas. GUI 400 is an exemplary, but non-limiting, embodiment of a policy creator UI, other embodiments may vary in architecture, style, and the fields provided.

Field 402 is directed towards a resource type for the policy. A user has supplied the corresponding value for field 402 such that the policy will cover VMs and VSDs. Field 404 is directed towards the policy type, for which the user has provided the value of lease. In some embodiments, field 402 is not included in GUI 400 because the resource type may be implied by the policy type (e.g., the value of field 404) Field 406 is directed towards the name or ID of the policy to be created, for which the user has provided the values of "Test Policy." Field 408 is directed towards a description for the policy, for which the user has provided the descriptive string "Lease policy for benchmarking network performance."

GUI 400 may include a scope selector portion 430 that includes one or more fields. In the non-limiting embodiment shown in FIG. 4, scope selector portion 430 of GUI includes two fields: field 410, which may be employed to select a scope at the organization- and/or project-level and field 412 that may be employed to provide criteria, as discussed throughout. More particularly, field 410, within scope selector portion 430, may be directed towards, at least partially, defining the scope of the policy, which the user has provided some value, which is an identification that maps to the organization: OrganizationA. In an embodiment not shown in FIG. 4, the value of a project ID may be provided in field 410. Field 412, within scope selector portion 430, is directed towards custom criteria, which may provide additional filters that narrow the scope of the policy. As noted throughout, criteria may include one or more logical statements that evaluate to true or false for the various resources. In the various embodiments, the logical statements are applied to any resource within the scope of the policy, and the policy is applied only to resources where the statements evaluate to true. Thus, the criteria field 412 may be employed as a filter to limit the scope of the policy. In the non-limiting example of FIG. 4, the user has provided nested criteria that evaluates to true for any resource that is associated with a resource.id that is equivalent to "resource prototype" or any machine that is associated with the cost center: "A1234".

Field 414 is directed towards the enforcement type of the policy, for which the user has provided the value of hard (as compared to a soft enforcement type). Field 416 is directed towards the default lease period of the resources that are within the scope of the policy, for which the user has provided the value of 10 days. Field 418 is directed towards a maximum lease period, for which the user has provided the value of 100 days. In this example, the lease of a resource within the scope of the policy may be set to expire after 10 days. Before the lease is terminated, the user may be queried as to whether they wish to renew and/or continue the lease. The user may renew the lease. For example, the lease may be renewed a total of nine times for a maximum lease period of 100 days. The field 420 is directed towards the grace period of the lease, where the user has provided the value of 3 days. In this embodiment, each resource will not be terminated and/or re-allocated for a period of 3 days after the lease period has expired. Note that the fields presented to the user via UI 400 may be based on the provided values for the fields of resource type 402 and/or policy type 404 (or the values for other fields). Thus, the policy schema employed to provide the fields in UI 400 might be based on the policy type.

A user may save the policy via the save button 422. Saving the policy may trigger the automatic encoding of the policy. The user may cancel the policy via the cancel button 426. A user may request a preview of the governance of policy via the preview button 424. For example, entering a preview mode via preview mode 420 may trigger a start of process 520 of FIG. 5B. As noted throughout, the preview mode may provide an indication of the effective policy, as well as the effective policy's impacts to each of the targeted resources.

Figure 5A:
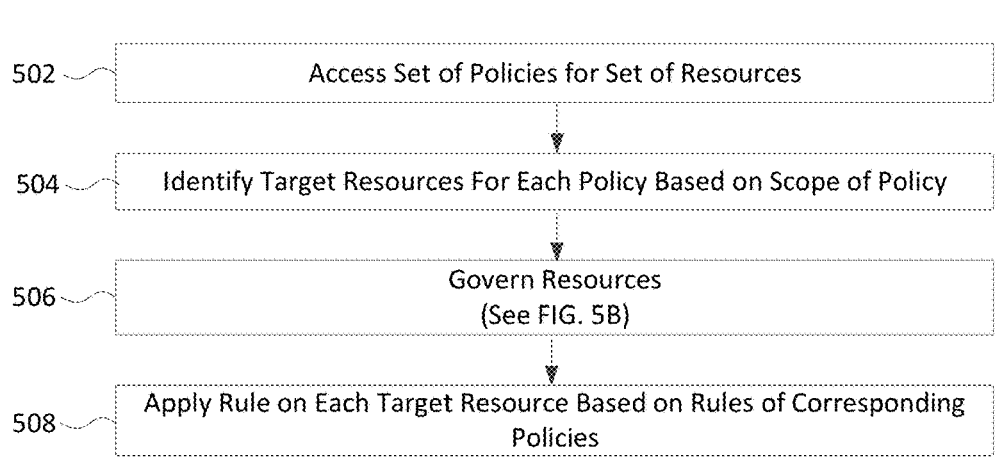
FIG. 5A illustrates a flowchart of exemplary processes for operating a distributed-computing system, in accordance with some embodiments.

FIG. 5A illustrates a flowchart of exemplary processes 500 for operating a distributed-computing system, in accordance with some embodiments. At least portions of process 500 may be performed, for example, by one or more computing devices included in the distributed system (e.g., system 100 of FIG. 1A). In some embodiments, the distributed-computing system comprises resources, such as but not limited to virtual resources (VMs, VSDs, and the like) that are communicatively coupled to a computing device (e.g., policy server computing device 104 of FIG. 1A) that implements a policy engine (e.g., policy engine 102 of FIG. 1A and/or policy engine 300 of FIG. 3). In process 500, some blocks are, optionally, combined, the order of some blocks is, optionally, changed, and some blocks are, optionally, omitted. In some embodiments, additional operations may be performed in combination with process 500.

At block 502, a set of policies for a set of resources of the computing system may be accessed. For instance, a set of policies may be accessed from a policy store. Each policy may include a scope and a rule. At block 504, one or more target resources may be identified for each policy in the set of policies based on the scope of the policy. In some embodiments, for each policy of the set of policies, a subset of the set of resources may be associated with the policy based on the scope of the policy. The subset of resources associated with a policy may be include the target resources for the policy.

At block 506, the resources may be governed. That is, one or more effective policy computations rules may be applied to the policies. Various embodiments of governing resources and/or applying effective policy computations are discussed in conjunction with at least process 520 of FIG. 5B. However, briefly here, the policies may be selected, ranked, filtered, merged, and enforced based on the scope of the policies. At block 508, rules may be applied on target resources based on the corresponding policies. In at least one embodiment, at block 508, actions may be performed on the target resources based on the one or more rules for the computed effective policy. For example, for each policy, one or more actions may be performed on each of the resources targeted by the policy, based on the rule of that policy.

Figure 5B:
FIG. 5B illustrates a flowchart of exemplary process for governing resources in accordance with some embodiments.

FIG. 5B illustrates a flowchart of exemplary process 520 for governing resources in accordance with some embodiments. At block 522, a set of policies may be selected for a given scope (or a range of scopes). At block 524, the selected policies may be ranked based on one or more priority (or ordering) rules. For example, policies with an enforcement type of hard may be ranked higher than policies with an enforcement type of soft. Organization (or tenant) level policies may be ranked higher than project level policies. Non-specialized policies (or policies with a broader scope) may be ranked higher than policies with more specialized (or narrow) scopes. For example, policies with less restrictive custom criteria may be ranked higher than policies with more restrictive criteria. Additionally, a timestamp associated with the creation of a policy may be used to rank the policies. For example, older policies may be ranked higher than newer policies.

At block 526, incompatible or conflicting policies may be filtered out of or discarded from the ranked set of policies. In some embodiments, if one or more hard policies remain in the filtered set, soft policies may be discarded from the set. At block 528, the policies that remain in the ranked and filtered set may be merged to iteratively generate an effective policy. For instance, the highest-ranking policy may be merged with the second highest-ranking policy to generate a current effective policy. The merging may be iterated over down the ranking of the policies to recursively compute the effective policy. Incompatible policies (policies that are inconsistent with the highest ranked policy) may be discarded and marked as being a conflicting policy. At block 530, a preview of the effective policy may be provided to a user. At block 532, the effective policy may be enforced. That is, the effective policy may be applied to the target resources. At block 534, the enforcement of the effective policy may be reported to the user.

In accordance with some implementations, a computer-readable storage medium (e.g., a non-transitory computer-readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for operating a distributed computing system that comprises a set of resources, the method comprising:
   at a policy server employing one or more processors and memory:
   detecting an update to a policy of a set of policies or another pre-defined triggering event;
   in response to the detecting, automatically:
   accessing the set of policies, wherein each policy of the set of policies includes one or more fields having values defining the policy;
   for each policy of the set of policies, associating a subset of the set of resources with the policy based on a scope of the policy;
   generating a priority ordering for a subset of the set of policies based on one or more ordering rules, wherein the scope of each policy in the subset of the set of policies includes a first subset of the set of resources;
   merging the subset of the set of policies based on the priority ordering to generate an effective policy, wherein the merging comprises:
   selecting a policy of the subset of policies with the highest priority as the effective policy for the subset of resources; and
   iteratively adding each policy of the subset of policies in order of priority from highest to lowest to the effective policy, wherein each policy of the subset of policies is checked for incompatibility with the effective policy prior to being added to the effective policy and in response to a determination that a respective policy is incompatible, the respective policy is discarded or the respective policy is changed to make the respective policy compatible with the effective policy prior to adding the respective policy to the effective policy, wherein iteratively adding includes for all policies that are added to the effective policy, merging the respective values of the fields of the respective policy that correspond to the fields of the effective policy; and enforcing the generated effective policy on the first subset of the set of resources.

2. The method of claim 1, wherein the scope of at least a portion of the policies of the set of policies is indicated by one or more organizations associated with the set of resources.

3. The method of claim 1, wherein the scope of at least a portion of the policies of the set of policies is indicated by one or more projects associated with the set of resources.

4. The method of claim 1, wherein the policy server performs the method only in response to detection of an update to a policy of the set of policies.

5. The method of claim 4, further comprising providing a preview indication of a plurality of effects that the effective policy will have on at least a portion of the first subset of the set of resources.

6. The method of claim 1, further comprising:
providing a user interface (UI) to a user;
receiving a definition of a user policy via the UI;
generating an encoding of the received user policy;
registering the user policy in a policy store; and
providing access to the encoding of the user policy to other users, via the policy store.

7. The method of claim 6, wherein the set of policies are registered at the policy store, wherein the policy store includes an auditing module that audits the registration of the user policy in the policy store.

8. The method of claim 1, wherein the subset of the set of policies includes two or more policies and the merging is performed prior to applying any portion of the effective policy to the first subset of the set of resources.

9. The method of claim 8, wherein a human-readable notation includes at least one of a JavaScript Object Notation (JSON) or a YAML Ain't Markup Language (YAML) notation.

10. The method of claim 1, wherein each policy of the set of policies includes a policy type.

11. The method of claim 1, wherein a first policy of the set of policies includes a value for a default lease period of a first resource of the set of resources, a value for a maximum lease period of the first resource, and a value for a grace period of the first resource.

12. The method of claim 1, wherein a first policy of the set of policies constrains a user from initiating an operation of a first resource of the set of resources.

13. The method of claim 1, wherein each policy of the set of policies includes an enforcement type of at least two possible values that indicate a priority for ranking the set of policies.

14. The method of claim 1, wherein the set of resources includes at least a set of virtual machines (VMs) and a set of virtual storage disks (VSDs).

15. The method of claim 1, wherein each policy of the set of policies includes one or more logical statements that, when applied to each resource in the set of resources, evaluates to true or false, and the evaluation of each of the one or more logical statement is applied as a filter that narrows the scope of the policy.

16. The method of claim 1, wherein a first policy of the set of policies targets each of a first resource and a second resource of the set of resources and the first and second resources are provided by separate resource providers.

17. The method of claim 1, wherein an enforcement of the set of policies is triggered by an update to a first policy of the set of policies.

18. A non-transitory computer-readable storage medium storing one or more programs configured to be executed by a policy server that operates a distributed computing system that comprises a set of resources, the policy server having one or more processors and memory, the one or more programs including instructions for:
detecting an update to a policy of a set of policies or another pre-defined triggering event;
in response to the detecting, automatically:
accessing the set of policies, wherein each policy of the set of policies includes one or more fields having values defining the policy;
for each policy of the set of policies, associating a subset of the set of resources with the policy based on a scope of the policy;
generating a priority ordering for a subset of the set of policies based on one or more ordering rules, wherein the scope of each policy in the subset of the set of policies includes a first subset of the set of resources;
merging the subset of the set of policies based on the priority ordering to generate an effective policy, wherein the merging comprises:
selecting a policy of the subset of policies with the highest priority as the effective policy for the subset of resources; and
iteratively adding each policy of the subset of policies in order of priority from highest to lowest to the effective policy, wherein each policy of the subset of policies is checked for incompatibility with the effective policy prior to being added to the effective policy and in response to a determination that a respective policy is incompatible, the respective policy is discarded or the respective policy is changed to make the respective policy compatible with the effective policy prior to adding the respective policy to the effective policy, wherein iteratively adding includes for all policies that are added to the effective policy, merging the respective values of the fields of the respective policy that correspond to the fields of the effective policy; and
enforcing the generated effective policy on the first subset of the set of resources.

19. A distributed-computing system comprising:
a set of resources; and
a policy server having one or more processors and memory storing one or more programs configured to be executed by the one or more processors, the one or more programs including instructions for:
detecting an update to a policy of a set of policies or another pre-defined triggering event;
in response to the detecting, automatically:
accessing a set of policies, wherein each policy of the set of policies includes one or more fields having values defining the policy;
for each policy of the set of policies, associating a subset of the set of resources with the policy based on a scope of the policy;
generating a priority ordering for a subset of the set of policies based on one or more ordering rules, wherein each policy in the subset of the set of policies has a scope that includes a first subset of the set of resources;
merging the subset of the set of policies based on the priority ordering to generate an effective policy, wherein the merging comprises:

selecting a policy of the subset of policies with the highest priority as the effective policy for the subset of resources; and iteratively adding each policy of the subset of policies in order of priority from highest to lowest to the effective policy, wherein each policy of the subset of policies is checked for incompatibility with the effective policy prior to being added to the effective policy and in response to a determination that a respective policy is incompatible, the respective policy is discarded or the respective policy is changed to make the respective policy compatible with the effective policy prior to adding the respective policy to the effective policy, wherein iteratively adding includes for all policies that are added to the effective policy, merging the respective values of the fields of the respective policy that correspond to the fields of the effective policy; and enforcing the generated effective policy to the first subset of the set of resources.

\* \* \* \* \*